United States Patent [19]

Sonntag

[11] Patent Number: 5,323,557
[45] Date of Patent: Jun. 28, 1994

[54] LANDSCAPING MAT

[76] Inventor: Donald J. Sonntag, R.R. #2, Box 100, Atlantic, Iowa 50022

[21] Appl. No.: 54,051

[22] Filed: Apr. 26, 1993

[51] Int. Cl.⁵ .............................................. A01G 17/00
[52] U.S. Cl. ........................................................ 47/25
[58] Field of Search ....................... 47/25, 25 R, 84 C; 52/58, 219

[56] References Cited

U.S. PATENT DOCUMENTS

| | | |
|---|---|---|
| 173,446 | 2/1876 | Cottman . |
| 1,130,545 | 3/1915 | Scott . |
| 3,005,287 | 10/1961 | Dudley ................... 47/25 |
| 3,287,851 | 11/1966 | Cramer ................... 47/25 |
| 3,571,972 | 3/1971 | Carter . |
| 3,750,731 | 8/1973 | Brimmell . |
| 4,268,992 | 5/1981 | Scharf . |
| 4,308,688 | 1/1982 | Revane . |
| 4,648,203 | 3/1987 | Worzek . |
| 4,934,093 | 6/1990 | Yanna ................... 47/25 |
| 4,986,025 | 1/1991 | Imperial . |
| 5,003,724 | 4/1991 | Vestuti . |
| 5,065,543 | 11/1991 | Brook . |
| 5,085,001 | 2/1992 | Crawley ................. 47/25 |

FOREIGN PATENT DOCUMENTS

| | | |
|---|---|---|
| 859392 | 12/1970 | Canada .................. 47/25 R |
| 2317216 | 10/1974 | Fed. Rep. of Germany ..... 47/25 R |
| 3121590 | 12/1982 | Fed. Rep. of Germany ..... 47/25 R |
| 45874 | 2/1909 | Switzerland .............. 47/25 |

Primary Examiner—Ramon S. Britts
Assistant Examiner—Joanne C. Downs
Attorney, Agent, or Firm—Zarley, McKee, Thomte, Voorhees, & Sease

[57] ABSTRACT

A landscaping mat is provided for surrounding a tree trunk and upstanding posts so as to eliminate the need to mow and trim around the tree or post. The mat includes a flexible inner portion, an intermediate portion surrounding the inner portion, and an outer portion surrounding the intermediate portion. The intermediate portion is thicker than the inner portion, and the outer portion is tapered to an outer perimeter edge. A slit extends from the perimeter edge to a central opening in the inner portion so as to allow the mat to be placed in position around a tree trunk or post. Alternatively, the slit may extend through the diameter of the mat so as to define two mirror image mat sections. Concentric scored lines are provided around the central opening and can be cut so as to increase the diameter of the opening so as to accommodate different sized tree trunks or posts. A rib may be provided on the intermediate portion for retaining ornamental materials, such as rocks, bark, wood chips or mulch. Alternatively, the upper surface of the mat may be textured and colored so as to resemble such ornamental materials.

15 Claims, 3 Drawing Sheets

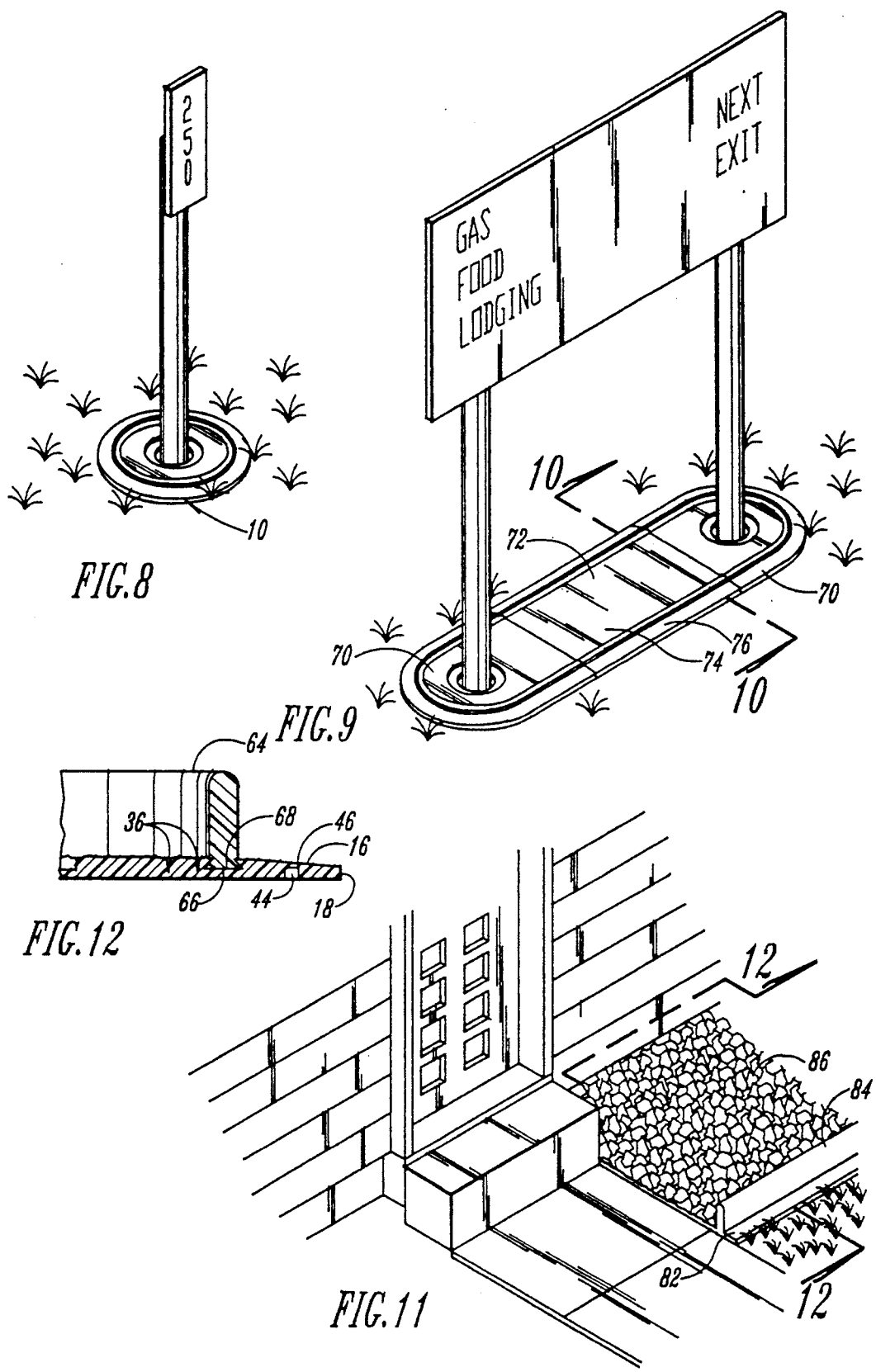

LANDSCAPING MAT

BACKGROUND OF THE INVENTION

Landscaping mats and other types of covers have long been used to prevent grass and weeds from growing in undesired areas. Such mats have been used around trees so as to facilitate mowing around the tree trunk. Protector devices have also been used around trees to protect the tree trunk from damage. An example of one such protector device is disclosed in U.S. Pat. No. 4,648,203, which has a central opening through which the tree trunk extends, and a plurality of semi-circular slits forming concentric flaps, which can be removed to increase the diameter of the opening. While U.S. Pat. No. 4,648,203 is primarily a tree protector device, the device inherently functions to minimize the growth of weeds and grass around the tree trunk. However, the presence of the slits extending through the mat disclosed in the U.S. Pat. No. 4,648,203 allows grass and weeds to grow through the slits.

A primary objective of the present invention is the provision of a landscaping mat which covers and prevents growth of weeds and grass around tree trunks, sign posts, light posts, and other objects extending upwardly from the ground.

Another objective of the present invention is the provision of a landscaping mat adapted to fit around tree trunks, posts, and other upwardly extending objects having various diameters.

A further objective of the present invention is the provision of a landscaping mat which eliminates the need to mow or trim an area immediately adjacent a tree trunk or post, and which allows for easy mowing and trimming around the perimeter of the mat.

Another objective of the present invention is the provision of a landscaping mat which will contain decorative material, such as rocks, bark, wood chips or mulch.

Still another objective of the present invention is the provision of a landscaping mat having an upper surface textured so as to simulate ornamental rocks, bark, wood chips or mulch.

Another objective of the present invention is the provision of a landscaping mat having a plurality of concentric scored circles which can be selectively cut and removed so as to accommodate various diameter tree trunks, posts and the like.

Still another objective of the present invention is the provision of a landscaping mat which is economical to manufacture, which can be quickly and easily installed, and which is durable in use.

These and other objectives will become apparent from the following description of the invention.

SUMMARY OF THE INVENTION

A landscaping mat for covering grass and weeds is provided, and includes a thin flexible inner or central portion, an intermediate portion surrounding the central portion and being thicker than the central portion, and an outer portion surrounding the intermediate portion and being tapered to a terminal perimeter edge. A central opening is provided in the inner portion through which a tree trunk or post extends. A slit extends from the perimeter edge to the central opening so that the mat can be placed in position around the tree trunk or post. The inner portion has concentric scored lines surrounding the central opening. The scored lines can be selectively cut to increase the diameter of the opening.

In a second embodiment, the mat comprises two mirror image sections which fit together around a tree trunk or post. Each section includes a thin flexible inner portion, a thicker intermediate portion, and a tapered outer portion. Concentric scored lines are provided on the inner portion of each section so that the central opening can be selectively increased in diameter to accommodate different sized trees or posts.

In the first and second embodiments, the mat may optionally include an upstanding rib to contain decorative material, such as rocks, wood chips, bark or mulch. Alternatively, the upper surface of at least the intermediate portion may be textured and colored so as to simulate such decorative materials. The intermediate portion is also provided with small drainage holes so that water may drain into the ground to nourish the tree roots.

In a third embodiment, the mat includes a first portion having a first thickness with opposite parallel sides, and a second portion extending from at least one of the sides and being tapered to an outer edge. The third embodiment can be used along sidewalks, walls, and other desired locations to cover weeds and grass so as to eliminate the need to mow and trim immediately adjacent such places.

DESCRIPTION OF THE DRAWINGS

FIG. 8 is a perspective view showing a landscaping mat similar to that shown in FIG. 1, as used on a sign post.

FIG. 9 is a perspective view of another alternative embodiment of the mat.

FIG. 11 is a sectional view of yet another embodiment of the mat of the present invention.

FIG. 12 is a sectional view taken along lines 12—12 of FIG. 11.

DETAILED DESCRIPTION OF THE PREFERRED EMBODIMENT

Figure 2:
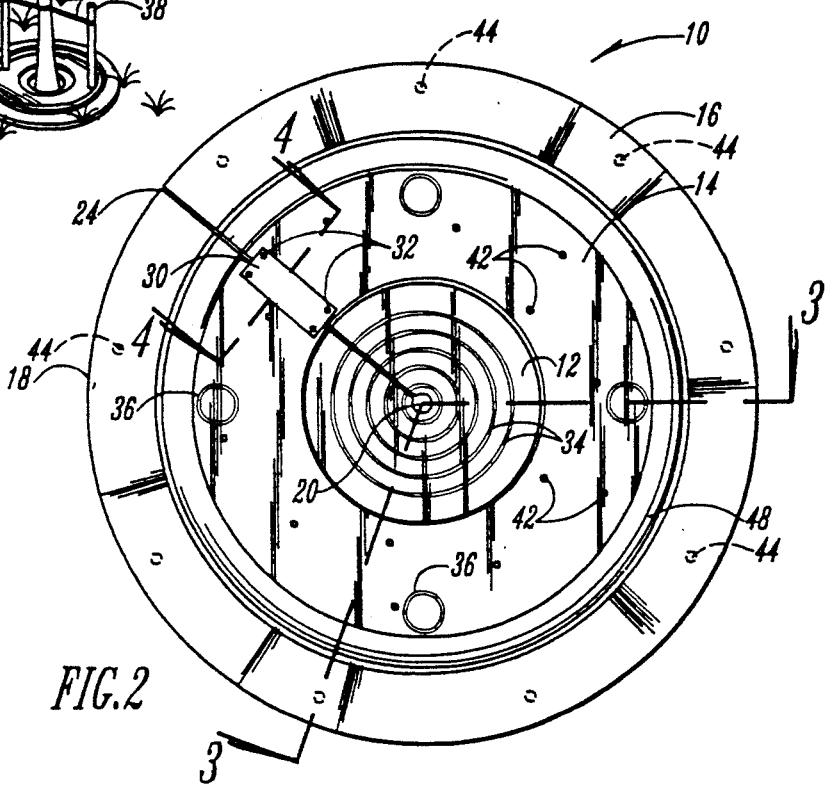
FIG. 2 is a plan view of the mat shown in FIG. 1.
Figure 3:
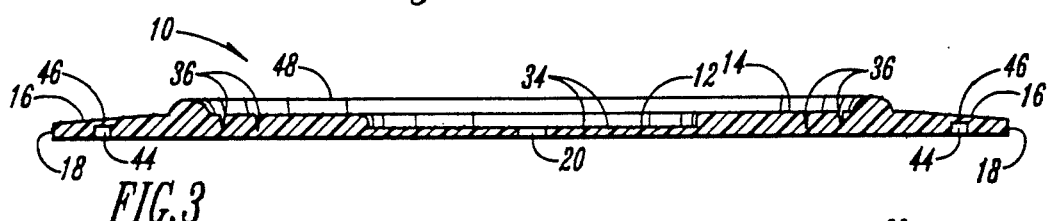
FIG. 3 is a sectional view of the mat taken along lines 3—3 of FIG. 2.
Figure 13:
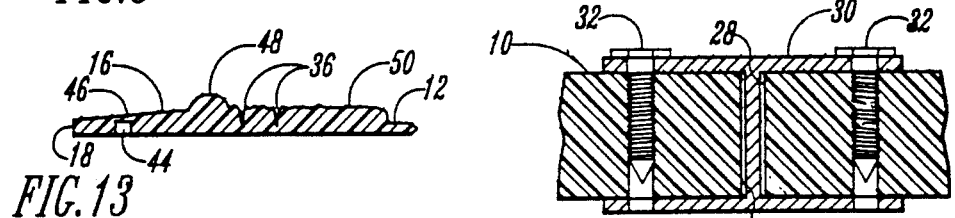
FIG. 13 is a partial sectional view showing an alternative textured surface of the mat shown in FIGS. 1-3.

The landscaping mat or weed and grass cover of the present invention is generally designated by the reference numeral 10 in the drawings. As best seen in FIGS. 2 and 3, the mat generally comprises three portions, a central or inner portion 12, an intermediate portion 14 and an outer portion 16. The inner portion 12 is relatively thin, with the intermediate portion 14 being thicker than the inner portion 12, as seen in FIG. 3. The outer portion 16 is tapered in cross section and terminates in an outer perimeter edge 18. In the preferred embodiment, the inner portion 12 is ⅛ inch thick, the intermediate portion 14 is ½ inch thick, and the outer portion 16 tapers down to a thickness of ¼ inch at the perimeter edge 18.

Figure 4:
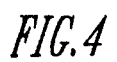
FIG. 4 is a partial sectional view taken along lines 4—4 of FIG. 2.

The inner portion 12 includes a central opening 20 through which the trunk of a tree 22 extends. A slit 24 extends from the perimeter edge 18 to the central opening 20 and defines opposing slit edges 26, 28 which can be spread apart to allow the mat 10 to be positioned around the tree trunk. After the mat is in position, a splice member 30 may be used to interconnect edges 26, 28. The splice member 30 is shown to have an I-beam construction in FIG. 4. It is understood that the splice member may take other configurations, such as T-shaped, or a flat plate. The splice member 30 is secured to the mat 10 with self-tapping screws 32. As an alternative to screws 32, the splice member 30 may be secured to the mat 10 with other fasteners, such as spikes (not shown) extending through the splice member and the mat and extending into the ground.

The inner portion 12 of the mat 10 includes a plurality of concentric scored lines 34 extending annularly around the central opening 20. The scores lines 34 may be selectively cut so that a part of the inner portion can be removed to increase the diameter of the central opening, thereby accommodating tree trunks having different diameters and allowing for growth of a tree trunk. The scored lines 34 do not extend through the inner portion 14, thereby preventing grass or weeds from growing upwardly through the mat.

Figure 1:
FIG. 1 is a perspective view of the landscaping mat of the present invention as used around a tree.

Scored circles 36 are provided on the opposite sides of intermediate portion 14. The scored circles 36 can be cut out such that stakes 38 can extend through the mat 10, as seen in FIG. 1. Such stakes are often used on young trees with a tensioned wire 40 so that the tree will grow vertically.

The intermediate portion 14 of the mat 10 also includes a plurality of drainage holes 42 which allow water to pass through the mat to the tree roots. The outer portion 16 includes a plurality of indentations 44 on the bottom surface thereof so as to define a reduced thickness spot 46 through which a spike (not shown) can be punched through for securing the mat 10 to the ground.

An upstanding rib 48 may be provided on the intermediate portion 14 adjacent outer portion 16. Preferably, the rib 48 is formed intergrally with the intermediate portion 14. The height of the rib 48 allows ornamental and decorative material, such as rocks, bark, wood chips or mulch to be contained within the mat area bounded by the rib. The well defined by the rib 48 may be filled with water having dissolved fertilizer for providing additional nutrients to the tree roots. Alternatively, at least the intermediate portion 14 of the mat 10 may be formed with a textured and colored surface 50 so as to simulate such decorative materials.

Figure 5:
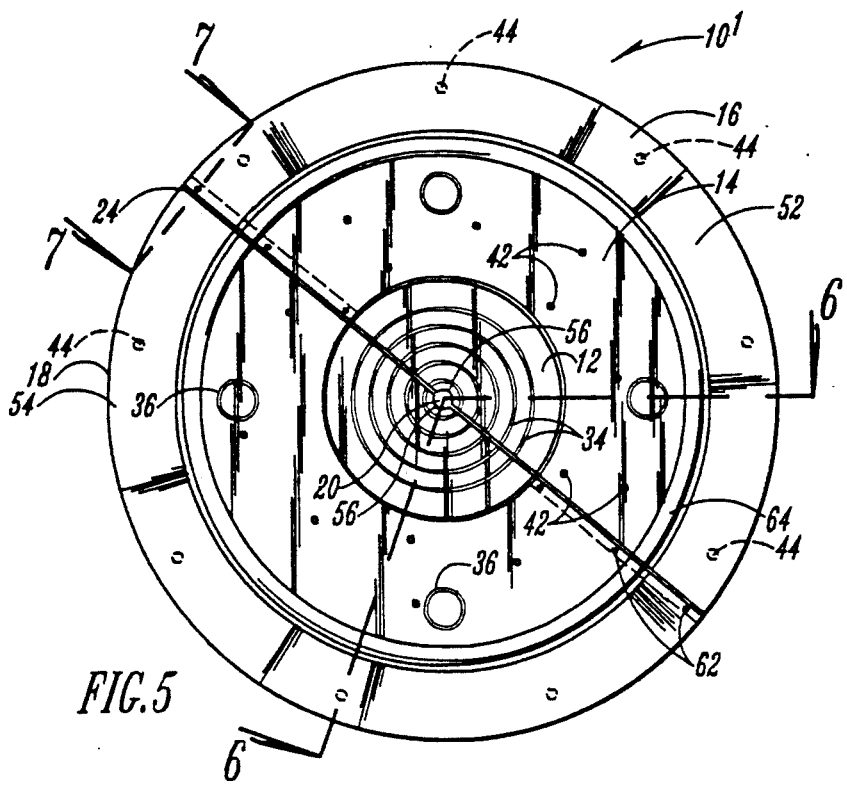
FIG. 5 is a plan view of an alternative embodiment of the mat of the present invention.
Figure 6:
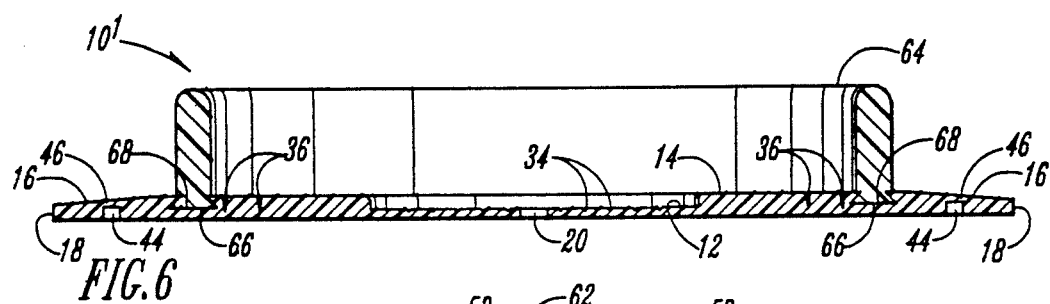
FIG. 6 is a sectional view taken along lines 6—6 of FIG. 5.
Figure 7:
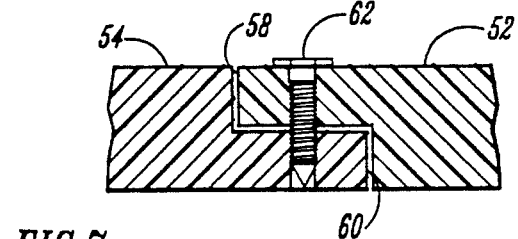
FIG. 7 is a partial sectional view taken along lines 7—7 of FIG. 5.

A second embodiment of the landscaping mat is designated by the reference numeral 10' in FIGS. 5-7. The mat 10' is substantially similar to the mat 10 shown in FIGS. 1-4, and like reference numerals are used to designate like parts. In the mat 10', the split 24 extends through the entire diameter of the mat so as to form two mirror image mat sections 52, 54. The mat sections 52, 54 each include a central notch 56 which forms the central opening 20 when the mat sections are matingly joined, as shown in FIG. 5. The slit edges 58, 60 are stepped, as shown in FIG. 7, such that the edges overlap one another. A screw 62 or spike (not shown) may extend through the edges 58, 60 to secure the edges together.

As seen in FIG. 6, an upstanding rib or edger 64 is provided on the mat 10'. The intermediate portion 14 includes a recess 66 adapted to matingly and lockingly receive a projection 68 on the bottom of the rib 64. As with the rib 48, the rib 64 retains ornamental rock, wood chips, bark or mulch.

The landscaping mat of the present invention can also be used around posts, such as highway signs shown in FIGS. 8 and 9, light posts, guard rail posts, mail box posts, stop sign posts, fire hydrants, and other objects extending upwardly from the ground. When used with such inanimate objects, the mat may either be a single piece structure such as mat 10, or a two piece structure such as mat 10'. Also, scored lines 34 may be eliminated if the central opening 20 is manufactured to a designated diameter for the desired object. The opening may also be square to matingly fit a square post. Scored circles 36 can also be eliminated, since there would be no need for support stakes.

Figure 10:
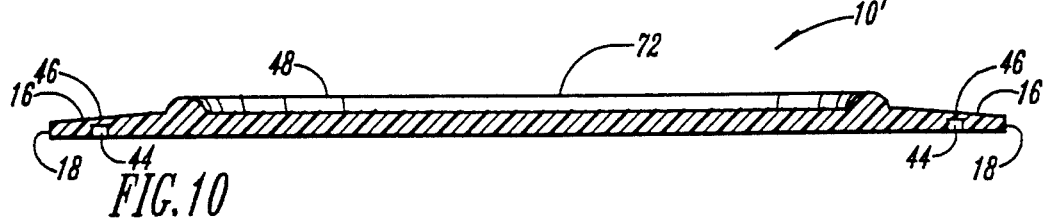
FIG. 10 is a sectional view taken along lines 10—10 of FIG. 9.

While the mats 10 and 10' are shown to be circular in FIGS. 2 and 5, it is understood that the mat may take other shapes. For example, in FIG. 9, the mat is elongated, and includes U-shaped end sections 70 with an interconnecting midsection 72. U-shaped sections 70 include the inner portion 12, the intermediate portion 14 and the tapered outer portion 16. The midsection 72 does not include an inner portion, since no post holes are provided in the midsection. Midsection 72 includes a portion 74 having the same thickness as intermediate portion 14 and a tapered edge on each side of the midsection, similar to the outer portion 16, as seen in FIGS. 9 and 10.

A third embodiment of a landscaping mat 78 is shown in FIGS. 11 and 12. Mat 78 includes a primary portion 80 with a tapered portion 82 extending along at least one side of the primary portion 80. An upstanding rib 84 may be provided on the mat 78, similar to ribs 48 or 64, so as to retain decorative and ornamental materials. The mat 78 may be formed with a textured and colored upper surface 86 which resembles rocks, bark, wood chips or mulch, as seen in FIG. 12. The mat 78 may be used along sidewalks, walls, gardens, and other locations where it is desired to eliminate the need to mow and trim grass and weeds.

Preferably, the mat of the present invention is made of a flexible material so that the thin inner portion 12 deflects upwardly as the tree trunk grows. Also, it is understood that a landscaping cloth may be used beneath the mat so as to prevent weeds from growing upwardly through the drainage holes.

Preferably, the central opening 20 has a 1 inch diameter, and concentric scored lines 34 have a radius which increases 1 inch for each successive line. The diameter of the inner portion 12 is preferably 1 foot, with the overall diameter of the mat 10 or 10' being 3 feet. The outer tapered portion 16 is preferably at least 3 inches wide, so as to allow a lawn mower to partially pass over the portion without damaging the rib 48 or 64. Preferably, the rib 48 has a ⅜ inch radius, while the rib 64 preferably extends ⅜ inch above the upper surface of the intermediate portion 14. The scored circles 36 are 1-3 inches in diameter to receive the support stakes 38.

The invention has been shown and described above in connection with the preferred embodiment, and it is understood that many modifications, substitutions and additions may be made which are within the intended broad scope of the invention. From the foregoing, it can be seen that the present invention accomplishes at least all of the stated objectives.

What is claimed is:

1. A landscaping mat for surrounding a tree trunk, a post, and other objects extending upwardly from the ground so as to prevent grass and weeds from growing adjacent the tree trunk, post or object, the mat comprising:

a flexible inner portion having a first thickness and an opening therein through which the tree trunk, post or object extends;

an intermediate portion surrounding the inner portion and having a second thickness greater than the first thickness;

an outer portion surrounding the intermediate portion and having a perimeter edge, the outer portion being tapered in cross section;

a slit extending from the perimeter edge to the opening in the inner portion and defining radially extending opposing edges, the opposing edges being adapted to spread apart from one another such that the tree trunk, post or object can be received in the opening in the inner portion.

2. The mat of claim 1 further comprising a splice member removably secured to each of the opposing edges so as to interconnect the opposing edges.

3. The mat of claim 1 wherein the inner portion includes a plurality of concentric scored lines located around the opening, the inner portion being selectively cut along one of the lines to increase the diameter of the opening.

4. The mat of claim 1 wherein the intermediate portion includes a plurality of drainage holes.

5. The mat of claim 1 wherein the intermediate portion includes a pair of opposing scored circles located on opposite sides of the opening, the scored circles being selectively removed for receipt of a stake through the mat.

6. The mat of claim 1 further comprising an upstanding rib extending upwardly from the intermediate portion so as to define a cavity for holding particulate material.

7. The mat of claim 6 wherein the rib is integrally formed with the intermediate portion of the mat.

8. The mat of claim 6 wherein the intermediate portion includes a recess and the rib includes a projection for mating receipt in the recess such that the rib is removably mounted on the intermediate portion.

9. The mat of claim 1 wherein the intermediate portion has an upper surface textured to resemble ornamental particulate material.

10. The mat of claim 1 wherein the outer portion has a substantially smooth upper surface and a lower surface with a plurality of recesses therein for receiving a ground-securing spike.

11. A weed cover for controlling growth of weeds and grass around an object, such as a tree or post, extending upwardly from the ground, comprising:

a pair of mirror image sections having edges which matingly abut one another;

each section including a flexible inner portion, a tapered outer portion, and an intermediate portion interconnecting the inner and outer portions, the inner portion being thinner in cross section than the intermediate portion;

each section having a notch, the notches forming a central opening through which the object extends when the sections are positioned with mating edges; and each section including a plurality of substantially semi-circular scored lines extending concentrically around the notch, the inner portion being selectively cut along one of the lines to increase the diameter of the opening.

12. The cover of claim 11 wherein the edges of the sections overlap one another, with fastening means securing the overlapped edges.

13. The cover of claim 11 wherein the intermediate portions each include a plurality of drainage holes.

14. The cover of claim 11 wherein the intermediate portion of each section includes a scored circle which is selectively removable for receipt of a stake through the cover.

15. The cover of claim 11 wherein the intermediate portion of each section includes an upstanding rib for retaining particulate material on the intermediate portion.

* * * * *